F. FAIRBANKS.
Scale-Beams.
No. 151,689. Patented June 9, 1874.
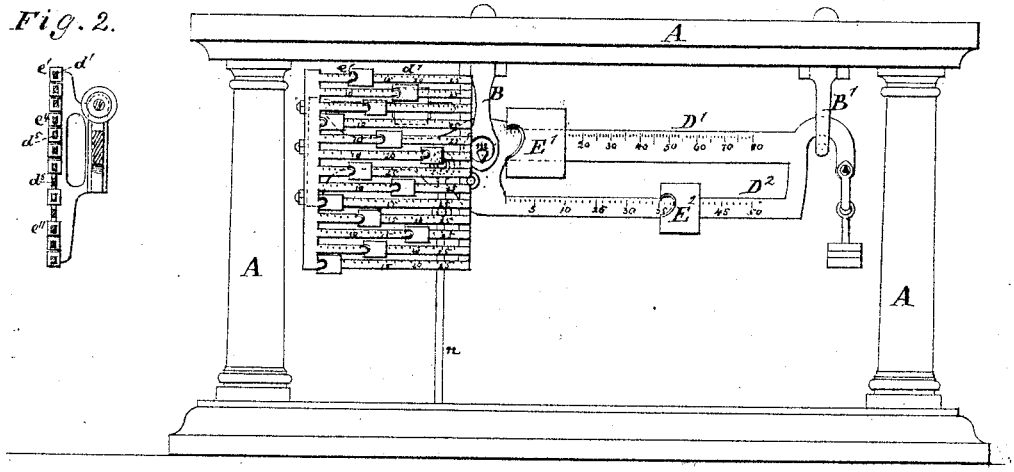
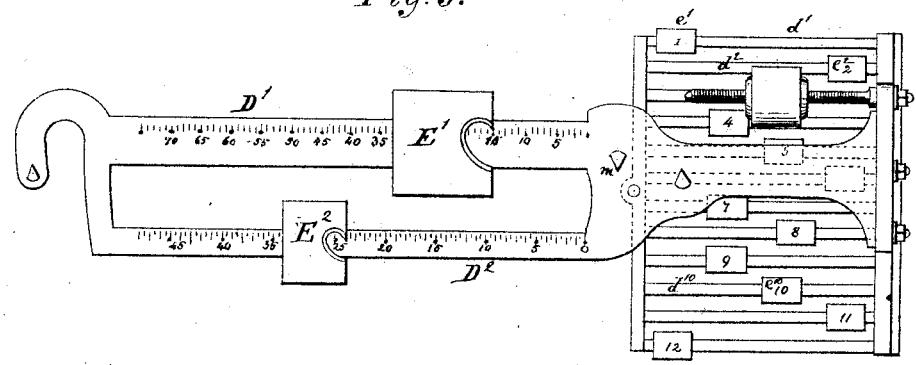
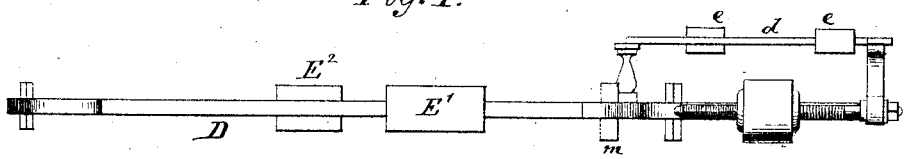
Witnesses.
H. Clay Smith
J. S. Evans
Inventor.
Franklin Fairbanks
By his atty
J. D. Stetson

UNITED STATES PATENT OFFICE.

FRANKLIN FAIRBANKS, OF ST. JOHNSBURY, VERMONT.

IMPROVEMENT IN SCALE-BEAMS.

Specification forming part of Letters Patent No. 151,689, dated June 9, 1874; application filed March 21, 1874.

*To all whom it may concern:*

Be it known that I, FRANKLIN FAIRBANKS, of St. Johnsbury, Caledonia county, Vermont, have invented certain Improvements relating to Scale Beams and Poises, of which the following is a specification:

The invention is more particularly intended for use at the mouth of coal-mines, where the coal is dumped from small cars moved by donkeys or by men into larger cars to be drawn by locomotives. A single scale provided with my invention supports the large car, and the weight is noted after each small car is dumped therein. When the large car is loaded its weight is determined by a single separate operation. It is important to weigh the small loads separately, in order to give proper credit to the several mines for the quantity of material hauled out by them. This invention allows the whole to be performed with little manual labor, and by men of limited education or facility in conducting mental operations.

The following is a description of what I consider the best means of carrying out the invention.

The accompanying drawings form a part of this specification.

Figure 1 is a side elevation of the entire beam, with its several poises and the supporting-frame in which it is suspended. Fig. 2 is a cross-section through a portion where the beam is constructed with a great number of parallel bars carrying separate poises. Figs. 3 and 4 are on a larger scale. Fig. 3 is an elevation of the beam, as seen from the back side. Fig. 4 is a plan view of the same.

Similar letters of reference indicate like parts in all the figures.

A is the supporting-frame. B is the loop in which the beam is hung, and B' is the loop or support which steadies the vibrating end. There may be the ordinary trig-loops and attachments, as used in ordinary scales. The beams, collectively, will be designated, when required, by the single letter D. Its several parts are marked $D^1$, $d^1$, &c. $D^1$ is the main graduated bar, carrying a poise, $E^1$. $D^2$ is a bar, carrying a poise, $E^2$. These bars and poises may be of ordinary construction, and perform their ordinary functions in weighing loads, allowing for tare, &c. On the other side of the central knife-edge $m$ the main beam is extended, and carries cross frame-pieces, connected as represented, which, in their turn, support a series of parallel bars marked $d^1$ $d^2$ $d^3$, &c. I will refer to these bars collectively, when required, by the single letter $d$. They are rigidly connected to the main beam, and form, in effect, parts thereof. All these bars are graduated, and on each is a poise, $e^1$ $e^2$, &c. The weights and graduations are so adjusted that when all the several poises $e^1$ $e^2$ are pushed to the extreme outward position the weight of the load on the scale-platform may be determined by the poises $E^1$ $E^2$ in the ordinary manner. When the poises $E^1$ $E^2$ are moved to their extreme inward position the weight on the platform of the scale may be determined by the poise $e^1$. The ordinary rod by which the load is connected to the beam is indicated by $n$. The platform-scale may be of any ordinary or suitable construction.

In the use of the scale, the large car adapted for ordinary or other general railroad transportation, is moved upon the platform, and its weight determined by the tare poise $E^2$ being moved to the right point on the bar $D^2$, and allowed to rest there. The poise $E^1$, and all the poises $e$, should, at this juncture, be each the zero of its respective graduation. Now one or more small car-loads arriving from the mine are dumped into the large car. So soon as all that is to be credited to one miner or to one account with the mine hands is thus deposited, the weight thus received is determined by moving the uppermost poise $e^1$. When the beam is thus again balanced an additional lot of coal may be received from one or more small cars, and the weight thereof is determined by moving the next poise $e^2$. Thus the reception of the several lots and the determination of the weight thereof are proceeded with until the large car is sufficiently loaded, when all the small poises $e$ are moved again to their extreme outward or zero positions, and the weight of the whole is determined by moving the poise E¹. The weights of the several small lots, and also of the total load being recorded at the proper times, there is no occasion for further mental labor. A superintendent or other party having more skill in figures may afterward add the several amounts, and enter the sums in the proper books.

The tare poise E² and the corresponding graduated bar D² perform only their usual functions, and may be omitted, if preferred.

I am aware that it has been before practiced to mount a number of small poises, each on a separate bar, so that successive additions to the load on a car, or the like, could be weighed by moving the several poises in a manner analogous to mine; but such device contained no provisions for subsequently weighing and determining the sum of all the weights by the movement of a single poise, and if there were, the addition of a beam and poise for the purpose to such a system would increase the depth of the beam. My improved construction, by mounting the main beam on the opposite side of the suspending-loop, avoids the difficulty.

I claim as my invention—

The scale-beam described, having a series of parallel bars, $d$, with corresponding poises $e$, on one side of the point of suspension, and the main beam $D^1$ and corresponding main poise $E^1$ on the opposite side thereof, adapted for weighing several loads, first separately, and then the sum all together, as herein specified.

In testimony whereof I have hereunto set my hand this 17th day of March, 1874, in the presence of two subscribing witnesses.

FRANKLIN FAIRBANKS.

Witnesses:
E. D. BLODGETT,
WM. P. FAIRBANKS.